UNITED STATES PATENT OFFICE.

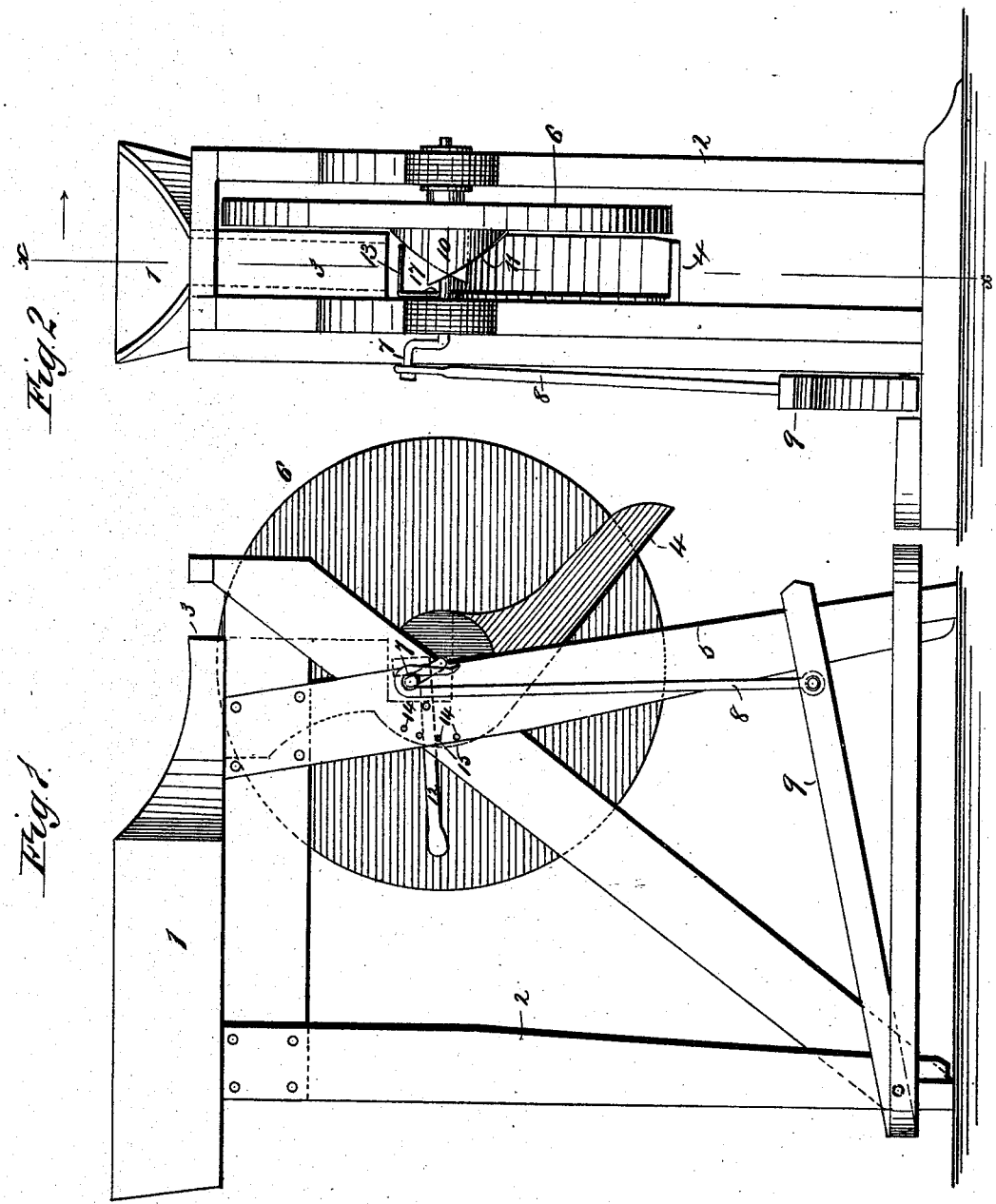

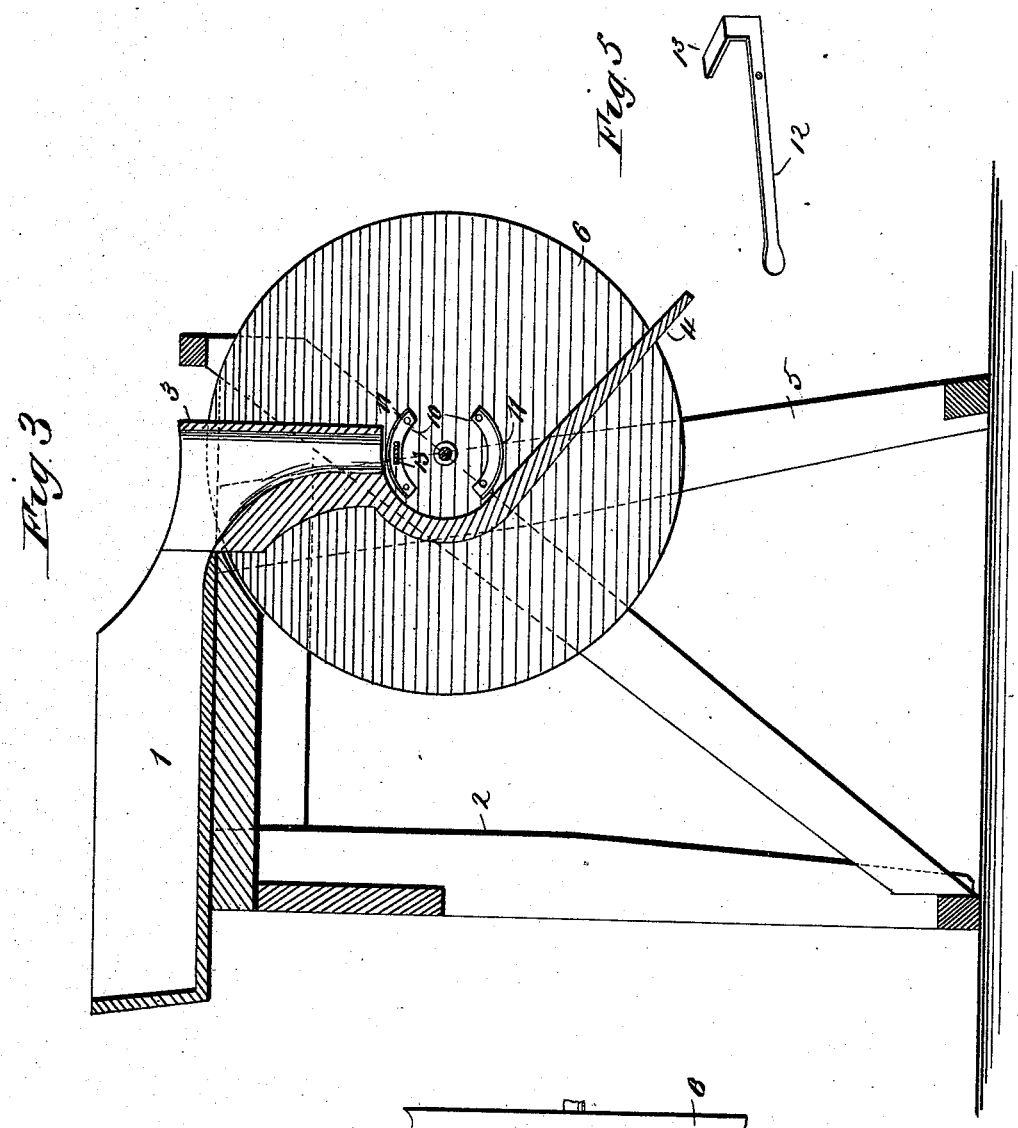

HARRY WILLITS, OF NEW BOSTON, ILLINOIS.

CORN-CUTTER.

SPECIFICATION forming part of Letters Patent No. 412,578, dated October 8, 1889.

Application filed November 14, 1888. Serial No. 290,822. (No model.)

*To all whom it may concern:*

Be it known that I, HARRY WILLITS, of New Boston, in the county of Mercer and State of Illinois, have invented a new and Improved Corn-Cutter, of which the following is a full, clear, and exact description.

This invention relates to machines for cutting corn on the ear, and has for its object to provide a simple and durable corn-cutter by means of which corn on the ear may be easily and effectively cut.

The invention consists in a corn-cutter constructed and arranged as hereinafter described and claimed.

Reference is to be had to the accompanying drawings, forming a part of this specification, in which similar figures of reference indicate corresponding parts in all the views.

Figure 1 is a side view of the machine. Fig. 2 is an end view. Fig. 3 is a vertical longitudinal section on the line $x\,x$, Fig. 2; and Figs. 4 and 5 are details of the invention.

In the construction of the invention a receptacle 1 is mounted on a frame 2, and is formed at one end with feed-chute 3, having located beneath its open lower end an inclined discharge-chute 4. Between the uprights 5 of the frame 2 is mounted a wheel 6 on a crank-shaft 7, connected by means of a vertical rod 8 with the treadle-lever 9. Upon the wheel 6, adjacent to the lower end of chute 3, are mounted segmental cutters or knives 10, preferably secured to the wheel 6 by nuts and bolts or other detachable fastenings, so as to be readily removed for repair. The cutters 10, which project laterally from the wheel 6, beneath the lower end of chute 4, are formed with inclined or spiral cutting-edges 11, which act with a shearing cut on the corn and do not tend to throw up the ear fed down through chute 3.

To regulate the feed of the ears, I provide a gage consisting of a lever-arm 12 pivoted to frame 2, and having an arm 13 at a right angle thereto extending across the lower end of the chute 3. The position of the arm 13 across the lower end of chute 3 may be adjusted by means of a series of holes 14 in one of the uprights 5 and a pin 15 projecting through one of the holes 14 and supporting the lever-arm 12.

In a corn-cutter constructed as hereinbefore set forth the knives will be rotated by easily operating the treadle-lever 9, rod 8, and wheel 6 without any sudden resistance and with a steady and positive shearing cut. By locating the cutters on the wheel 6 within its circumference and adjacent to its center the cutting resistance is far less than where the cutters are located at the circumference of the wheel.

Having thus described my invention, what I claim as new, and desire to secure by Letters Patent, is—

1. In a corn-cutter, the combination, with a feed-chute, of a vertical wheel and segmental cutters having oppositely-inclined cutting-edges and secured to the side of the wheel below the lower end of the chute and on opposite sides of the axis of the said wheel, substantially as described.

2. In a corn-cutter, the combination, with a receptacle provided with a vertical feed-chute, of a vertical wheel, a series of segmental cutters having oppositely-inclined or spiral cutting-edges and secured to the side of the wheel below the lower end of the chute and on opposite sides of the axis of the said wheel, and an adjustable gage extending across the lower end of the chute, substantially as herein shown and described.

3. In a corn-cutter, the feed-chute 3, the vertical wheel 6, with cutters 10, having an inclined cutting-edge 11 projecting beneath the chute 3, and the gage consisting of a lever-arm 12, pivoted to frame 2, and having an arm 13 at right angles thereto and extending across the lower end of chute 3, and adjusting-pin 15, adapted to enter one of a series of holes 14 in the frame, substantially as shown and described.

4. A cutter consisting of receptacle 1, with feed-chute 3 and discharge-chute 4, a vertical wheel 6, having crank-shaft 7, treadle 9, connecting-rod 8, and the cutters 10, with an inclined cutting-edge 11 projecting beneath the chute 3, and a gage consisting of lever-arm 12, pivoted to a frame 2, and having an arm 13 at right angles thereto and extending across the lower end of chute 3, with the adjusting-pin 15, adapted to enter one of the series of holes 14 in frame 2, substantially as shown and described.

HARRY WILLITS.

Witnesses:
NELSON WHEELER,
GEO. W. WARNER.